(12) United States Patent
Hayashida et al.

(10) Patent No.: US 7,615,112 B2
(45) Date of Patent: Nov. 10, 2009

(54) INK SET FOR INK-JET RECORDING AND METHOD FOR PRODUCING TETRA-COMPOSITE BLACK IMAGE

(75) Inventors: Kenta Hayashida, Inazawa (JP); Kazuma Goto, Nagoya (JP); Yasuhiro Taga, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 12/128,670

(22) Filed: May 29, 2008

(65) Prior Publication Data

US 2008/0299316 A1 Dec. 4, 2008

(30) Foreign Application Priority Data

May 29, 2007 (JP) ............................. 2007-142268

(51) Int. Cl.
*C09D 11/02* (2006.01)
(52) U.S. Cl. .................................. 106/31.27
(58) Field of Classification Search ............... 106/31.27
See application file for complete search history.

(56) References Cited

U.S. PATENT DOCUMENTS

| | | | | |
|---|---|---|---|---|
| 5,700,314 A * | 12/1997 | Kurbayashi et al. | ...... | 106/31.27 |
| 5,910,812 A * | 6/1999 | Yamamoto et al. | .......... | 347/106 |
| 6,261,350 B1 * | 7/2001 | Kabalnov | ................. | 106/31.33 |
| 6,342,096 B1 * | 1/2002 | Kurabayashi | ............. | 106/31.27 |
| 6,467,875 B1 * | 10/2002 | Koga et al. | ..................... | 347/43 |
| 7,033,423 B2 * | 4/2006 | Rolly | ....................... | 106/31.27 |
| 7,198,665 B2 * | 4/2007 | Nakamura et al. | ....... | 106/31.52 |
| 2007/0186812 A1 * | 8/2007 | Koga et al. | ................ | 106/31.58 |
| 2008/0226825 A1 * | 9/2008 | Hayashida et al. | .......... | 427/256 |
| 2008/0257206 A1 * | 10/2008 | Rengaswamy et al. | ... | 106/31.43 |
| 2008/0286465 A1 * | 11/2008 | Sago | ........................... | 427/256 |
| 2008/0286468 A1 * | 11/2008 | Sago | ........................... | 427/288 |
| 2009/0165669 A1 * | 7/2009 | Iwamura et al. | .......... | 106/31.13 |

FOREIGN PATENT DOCUMENTS

JP 2005-036164 2/2005

OTHER PUBLICATIONS

U.S. Appl. No. 12/048,338—Official Filing Receipt, Specification, Drawings, Mar. 14, 2008.

\* cited by examiner

*Primary Examiner*—Helene Klemanski
(74) *Attorney, Agent, or Firm*—Banner & Witcoff, Ltd.

(57) ABSTRACT

An ink set for ink-jet recording is characterized in that, when a patch of each of an yellow dye ink, a magenta dye ink, a cyan dye ink and a black dye ink is subjected to an ozone resistance test, the OD value reduction ratios of the patches upon the ozone resistance test are such that the order of the OD value reduction ratios of the yellow, magenta and cyan components in the black dye ink patch is the reverse of the order of the OD value reduction ratios of the yellow component of the yellow dye ink patch, the magenta component of the magenta dye ink patch and the cyan component of the cyan dye ink patch.

3 Claims, 4 Drawing Sheets

INK SET FOR INK-JET RECORDING AND METHOD FOR PRODUCING TETRA-COMPOSITE BLACK IMAGE

CROSS REFERENCE TO RELATED APPLICATION

The present invention claims a priority from Japanese Patent Application No. 2007-142268, which was filed on May 29, 2007, the disclosure of which is herein incorporated by reference in its entirety.

BACKGROUND

1. Field of the Invention

The present invention relates to an ink set to be used for an ink-jet recording method and a method for producing a tetra-composite black image.

2. Description of the Related Art

In ink-jet recording, an achromatic image is formed with a black ink or a combination of yellow, cyan and magenta inks. However, when a dye is used as the coloring agent of each ink, a problem arises that the achromatic image is tinted as fading proceeds. Hence, in order to prevent achromatic image from being tinted during long term storage so that the achromatic color is maintained, a black ink has been proposed which is prepared by using a water-soluble black dye having a specific structure in combination with C.I. Direct Red 89.

When achromatic area in an image is formed with a single black ink, the area may be grainy when the achromatic color is light color. In some cases, in order to eliminate the graininess, such an achromatic area is formed with a combination of black, yellow, magenta and cyan inks. Furthermore, when an image such as photograph is printed, an achromatic area is generally formed with a combination of black, yellow, magenta and cyan inks. With such a printing method, high printing quality, including high-definition and high gradation, may be achieved. However, when the color of an image including an achromatic area fade, the achromatic area may be noticeably tinted, and therefore the image could look unnatural.

SUMMARY

An aspect of the present invention provides an ink set for ink-jet recording, comprising a yellow dye ink, a magenta dye ink, a cyan dye ink and a black dye ink. The ink set is characterized in that, when a patch of each of the inks is formed and is subjected to a predetermined ozone resistance test, OD (optical density) value reduction ratios of the patches upon the ozone resistance test are such that the order of the OD value reduction ratios of yellow, magenta and cyan components in the black dye ink patch is the reverse of the order of the OD value reduction ratios of a yellow component of the yellow dye ink patch, a magenta component of the magenta dye ink patch and a cyan component of the cyan dye ink patch.

Another aspect of the present invention provides a method for producing a tetra-composite black image, comprising producing a tetra-composite black image using a combination of a yellow dye ink, a magenta dye ink, a cyan dye ink and a black dye ink that constitute an ink set for ink-jet recording, the ink set comprising the yellow, magenta, cyan and black dye inks being configured such that, when a patch of each of the yellow, magenta, cyan and black dye inks is formed, OD value reduction ratios of the patches upon a predetermined ozone resistance test are such that the order of the OD value reduction ratios of yellow, magenta and cyan components in the black dye ink patch is the reverse of the order of the OD value reduction ratios of a yellow component of the yellow dye ink patch, a magenta component of the magenta dye ink patch and a cyan component of the cyan dye ink patch.

DESCRIPTION OF THE PREFERRED EMBODIMENTS

Figure 1:
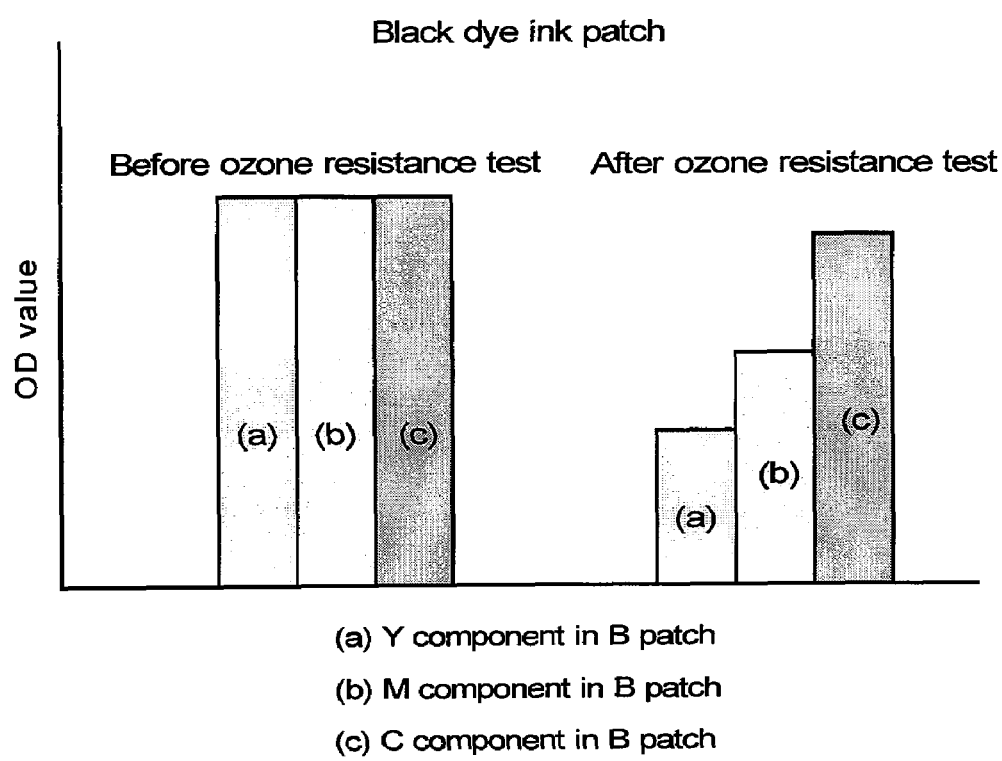
FIG. 1 is a schematic drawing describing the change in the OD value of each of the yellow, magenta and cyan components in a patch printed with a black dye ink before and after an ozone resistance test.

In view of the foregoing conventional problems, the present invention provides an improved ink set for ink-jet recording comprising a yellow dye ink, a magenta dye ink, a cyan dye ink and a black dye ink. Specifically, it is an object of the invention that, even when an achromatic area formed with a combination of the black, yellow, magenta and cyan dye inks is exposed to the atmosphere for a long period and the color of the achromatic area fade due to ozone in the atmosphere, the achromatic area is prevented from being tinted.

A black dye ink patch formed with a black dye ink may be divided to a yellow component, a magenta component and a cyan component. The present inventors have configured an ink set comprising a black dye ink, a yellow dye ink, a magenta dye ink and a cyan dye ink. Specifically, this ink set has been configured such that the order of the degrees of ozone resistance of the yellow, magenta and cyan components in a patch formed with the black dye ink is the reverse of the order of the degrees of ozone resistance of the yellow component of a patch formed with the yellow dye ink, the magenta component of a patch formed with the magenta dye ink and the cyan component of a patch formed with the cyan dye ink. When an image comprising an achromatic area is formed with a combination of the black, yellow, magenta and cyan dye inks and is exposed to the atmosphere for a long period, the color in the achromatic area may fade due to ozone in the atmosphere. However, the inventors have found that the achromatic area may be prevented from being tinted even in such a case and that the overall color balance of the image may be properly maintained.

More specifically, the ink set of the present invention is configured such that, when a patch of each of the yellow, magenta, cyan and black dye inks is formed and is subjected to the ozone resistance test, the order of the OD value reduction ratios of the yellow, magenta and cyan components in the black dye ink patch is the reverse of the order of the OD value reduction ratios of the yellow component of the yellow dye ink patch, the magenta component of the magenta dye ink patch and the cyan component of the cyan dye ink patch. When an image comprising an achromatic area formed with a combination of the black, yellow, magenta and cyan dye inks is exposed to the atmosphere, the color of the image may fade due to ozone in the atmosphere. However, the ink set has been configured such that, in the achromatic area, the variation of the OD value reduction ratio among the yellow, magenta and cyan components of the black dye ink may be compensated by the variation of the OD value reduction ratio among the yellow component of the yellow dye ink, the magenta component of the magenta ink and the cyan component of the cyan dye ink. Therefore, the variation of the total OD value reduction ratio among the yellow, magenta and cyan components in the achromatic area is less than that when the achromatic area is formed with the black ink alone or a combination of the yellow, magenta and cyan dye inks. Accordingly, the achromatic area is prevented from being unnaturally tinted, so that the colors of the image are well balanced.

Hereinbelow, the present invention will now be described in detail with reference to the drawings.

The ink set for ink-jet recording according to the present invention is a dye-based ink set comprising a yellow dye ink, a magenta dye ink, a cyan dye ink, and a black dye ink.

In the present invention, yellow is a color, on glossy paper, having a lightness (L*) in the range of about 70 or more and about 100 or less, a chroma (C*) in the range of about 55 or more and about 90 or less, and a hue angle (h) in the range of about 70 degree or more and about 140 degree or less in the L*a*b* colorimetric system (CIE 1976: JIS Z8729). A yellow ink is an ink that alone may produce the yellow color. Magenta is a color having a lightness (L*) in the range of about 40 or more and about 70 or less, a chroma (C*) in the range of about 60 or more and about 100 or less, and a hue angle (h) in the range of about 320 degree or more and about 360 degree or less or of about 0 degree or more and about 10 degree or less in the L*a*b* colorimetric system (CIE 1976: JIS Z8729). A magenta ink is an ink that alone may produce the magenta color. Cyan is a color having a lightness (L*) in the range of about 50 or more and about 85 or less, a chroma (C*) in the range of about 40 or more and about 80 or less, and a hue angle (h) in the range of about 215 degree or more and about 255 degree or less in the L*a*b* colorimetric system (CIE 1976: JIS Z8729). A cyan ink is an ink that alone may produce the cyan color.

Black is a color in an achromatic range with a chroma (C*) of about 15 or less. A black ink is an ink that alone may produce the black color.

Tetra-composite black is a black color formed by color mixing or overstriking of a black ink, a yellow ink, a magenta ink and a cyan ink. The component ratio of the dots of the inks, when the inks are mixed or overstriked, varies depending on a printer. However, the component ratio of the black ink (b), yellow ink (y), magenta ink (m) and cyan ink (c), in volume, is set to b:y:m:c=about 0.2 to about 0.8:about 0.2 to about 0.8:about 0.2 to about 0.8:about 0.2 to about 0.8.

The ink set of the present invention is characterized in that, when a patch of each of the inks is formed and is subjected to a predetermined ozone resistance test, the OD value reduction ratios of the patches upon the ozone resistance test are such that the order of the OD value reduction ratios of the yellow, magenta and cyan components in the black dye ink patch is the reverse of the order of the OD value reduction ratios of the yellow component of the yellow dye ink patch, the magenta component of the magenta dye ink patch and the cyan component of the cyan dye ink patch.

In this case, the patch of each ink is preferably formed on glossy paper because the degree of ink bleeding is low during printing and vivid color may be obtained. As used herein, the glossy paper refers to paper having a coating layer for imparting surface smoothness to base paper (body paper). Examples of the glossy paper include, without limitation, photo glossy paper BP61GLA (product of Brother Industries, Ltd.); premium photo glossy paper for color ink-jet printing (product of Oji paper Co., Ltd.); high definition photo output ultra glossy paper for ink-jet printing (product of KOKUYO Co., Ltd.); Photo-like QP "photo quality" series (product of KONICA MINOLTA HOLDINGS, INC.); Photo Finishing Pro and Photo Finishing Advance of KASSAI® series and FUJI film premium glossy paper (products of FUJIFILM Corporation); and the like.

Preferably, an area with an OD value of about 1.0 among gradation samples printed on glossy paper with each ink is used as the patch of the ink.

No particular limitation is imposed on the conditions of the ozone resistance test so long as all the patches are subjected to the same test. For example, the ozone resistance test is performed under the conditions of an ozone concentration of 1 ppm, a chamber temperature of 24° C. and a chamber relative humidity of 60% for about 40 hours (this corresponds to an exposure for about one year in an actual environment).

The OD value of each patch is measured before and after the ozone resistance test, and then the OD value reduction ratio upon the test is computed from the following equation:

$$OD \text{ value reduction ratio}(\%) = \frac{OD \text{ value before test} - OD \text{ value after test}}{OD \text{ value before test}} \times 100$$

FIGS. 1 to 4 schematically describe the change in the measured OD value before and after the ozone resistance test for each of the yellow, magenta and cyan components in various ink patches. In each of these figures, the B ink, the Y ink, the M ink and the C ink represent a black dye ink, a yellow dye ink, a magenta dye ink and a cyan dye ink, respectively. The B patch, the Y patch, the M patch and the C patch represent the black dye ink patch, the yellow dye ink patch, the magenta dye ink patch and the cyan dye ink patch, respectively. The Y component, the M component and the C component represent the yellow component, the magenta component and the cyan component, respectively.

As shown in FIG. 1, in the black dye ink patch, even if the OD values of the yellow, magenta and cyan components are identical before the ozone resistance test, the OD values of the color components are no longer the same after the ozone resistance test and the black dye ink patch may be tinted. This is because the OD value reduction ratios of the color components are significantly different from one another.

Figure 2:
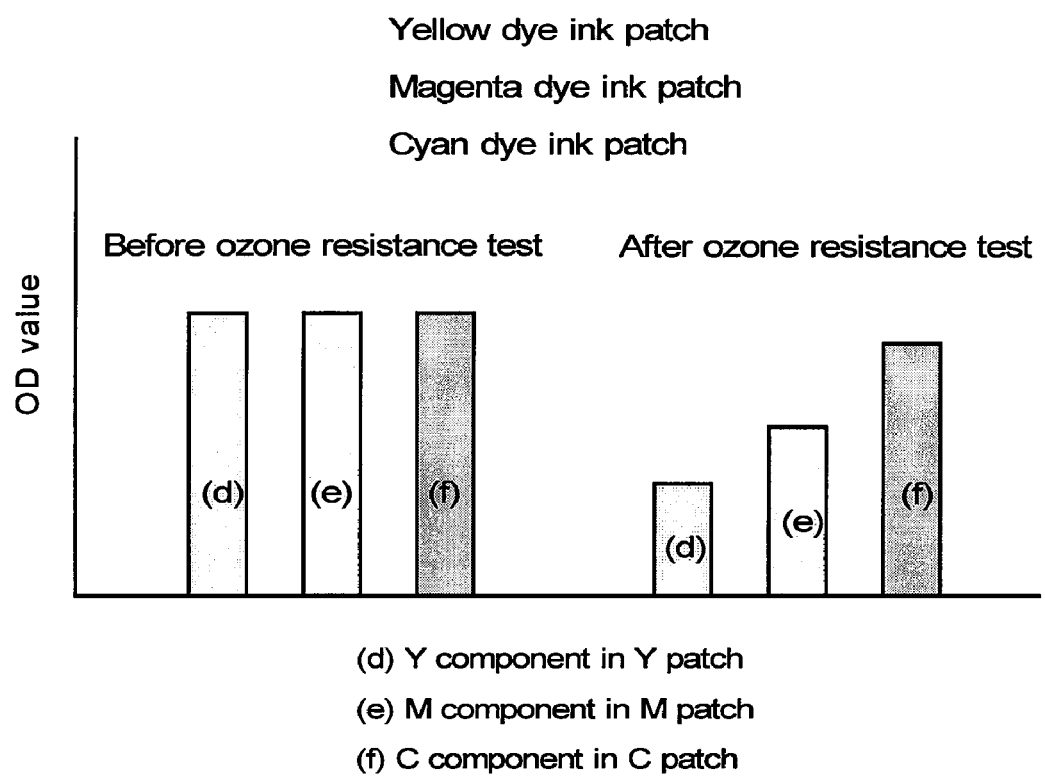
FIG. 2 is a schematic drawing describing the change in the OD value of each of a patch printed with a yellow dye ink, a patch printed with a magenta dye ink and a patch printed with a cyan dye ink before and after the ozone resistance test.

As shown in FIG. 2, also in the yellow dye ink patch, the magenta dye ink patch and the cyan dye ink patch, even if the OD values of the patches are identical before the ozone resistance test, the OD values of the patches are no longer the same after the ozone resistance test. This is because the OD value reduction ratios of the patches are different from one another. Therefore, a composite black formed with a combination of the yellow, magenta and cyan dye inks may be tinted after the ozone resistance test.

Figure 3:
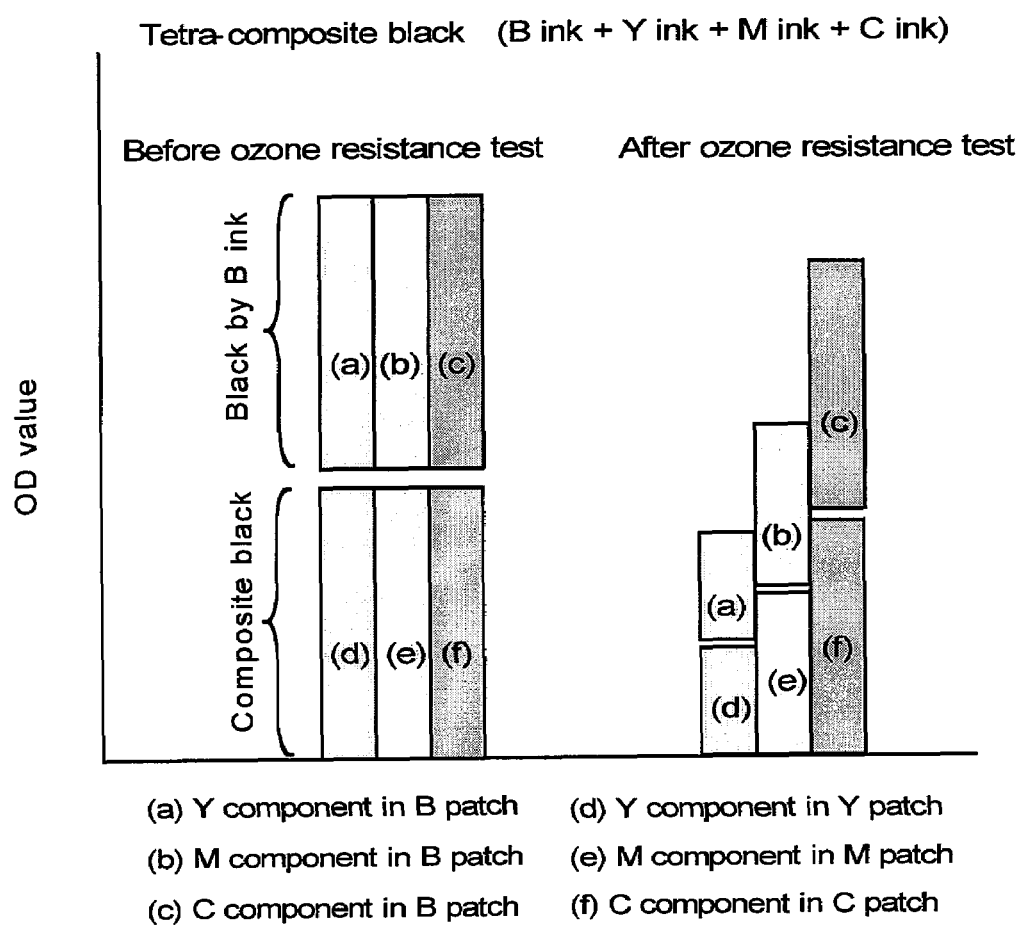
FIG. 3 is a schematic drawing describing the change in the OD value of the yellow, magenta and cyan components in a tetra-composite black image before and after the ozone resistance test, the tetra-composite black image being formed with a combination of black, yellow, magenta and cyan dye inks in a conventional ink set for ink-jet recording.

The tinted black color of the black dye ink and the tinted composite black are particularly noticeable when an light achromatic area is formed with the black dye ink or formed with the composite black. As has been described, in order to eliminate the graininess in the light achromatic area, a tetra-composite black may be used which is formed with a combination of a black dye ink, a yellow dye ink, a magenta dye ink and a cyan dye ink. In such a case, as shown in FIG. 3, when a color component having a large OD value reduction ratio in the black dye ink patch and a color component having a large OD value reduction ratio in the yellow dye ink patch, the magenta dye ink patch and the cyan dye ink patch are the same as each other and when a color component having a small OD value reduction ratio in the black dye ink patch and a color component having a small OD value reduction ratio in the yellow dye ink patch, the magenta dye ink patch and the cyan dye ink patch both are the same as each other, the tinted colors in the achromatic area are particularly noticeable.

Figure 4:
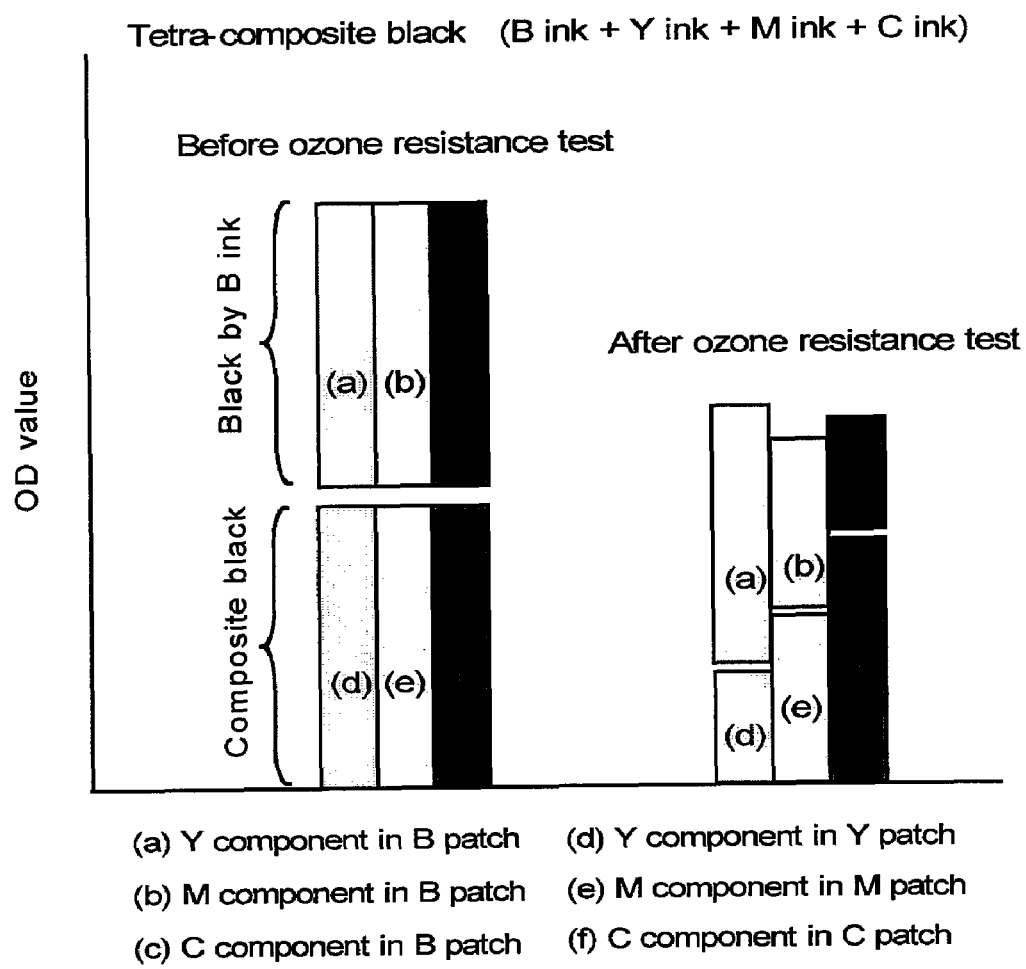
FIG. 4 is a schematic drawing describing the change in the OD value of the yellow, magenta and cyan components in a tetra-composite black image before and after the ozone resistance test, the tetra-composite black image being formed with a combination of black, yellow, magenta and cyan dye inks in an ink set for ink-jet recording of the present invention.

In the present invention, as shown in FIG. 4, the order of the OD value reduction ratios of the yellow, magenta and cyan components in the black dye ink patch before and after the ozone resistance test is the reverse of the order of the OD value reduction ratios of the yellow component of the yellow dye ink patch, the magenta component of the magenta dye ink patch and the cyan component of the cyan dye ink patch before and after the ozone resistance test. Therefore, in an area where a tetra-composite black is formed with a combination of the black, yellow, magenta and cyan dye inks, the variation of the OD value among the color components after the ozone resistance test is less than that when the achromatic area is formed with the black dye ink alone or formed with a composite black formed with the yellow, magenta and cyan dye inks. Therefore, according to the ink set of the present invention, even when a formed image is exposed to the atmosphere and the color thereof fade due to ozone in the atmosphere, the achromatic area in the image is prevented from being tinted unnaturally.

The ink set of the present invention may be obtained as follows. First, patches of various yellow, magenta, cyan and black dye inks are formed. Then, the OD values of the yellow component of each yellow dye ink patch, the magenta component of each magenta dye ink patch and the cyan component of each cyan dye ink patch are measured before and after the ozone resistance test. In addition, the OD values of the yellow, magenta and cyan components in each black dye ink patch are measured before and after the ozone resistance test. Subsequently, the OD value reduction ratio is computed for each of the patches, and a suitable black dye ink, a yellow dye ink, a magenta dye ink and a cyan dye ink are selected so as to satisfy the reverse relation described above.

The inks may be selected such that the difference between the maximum value and the minimum value among (By+Cy)/2, (Bm+Cm)/2 and (Bc+Cc)/2 is about 10% or less. Here, By is the OD value reduction ratio (%) of the yellow component in the black dye ink patch, Bm is the OD value reduction ratio (%) of the magenta component in the black dye ink patch, Bc is the OD value reduction ratio (%) of the cyan component in the black dye ink patch, Cy is the OD value reduction ratio (%) of the yellow component of the yellow dye ink patch, Cm is the OD value reduction ratio (%) of the magenta component of the magenta dye ink patch, and Cc is the OD value reduction ratio (%) of the cyan component of the cyan dye ink patch.

In this manner, an achromatic color area formed with a combination of the black, yellow, magenta and cyan dye inks are more reliably prevented from being tinted even when fading occurs.

Each of the yellow, magenta, cyan and black dye inks constituting the ink set for ink-jet recording of the present invention may be prepared from a known dye, water, a water soluble organic solvent and, if necessary, additives.

Examples of the dye used in the black dye ink include, without limitation, dyes represented by the general formula (Bk-0) below; C.I. Acid Blacks 2, 7, 24, 26, 31, 52, 63, 112 and 118; C.I. Direct Blacks 17, 19, 32, 51, 71, 108, 146, 154 and 168; C.I. Basic Black 2; C.I. Food Blacks 1 and 2: and the like.

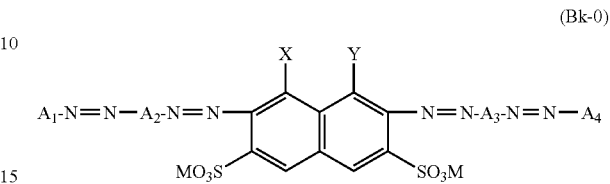

(Bk-0)

In general formula (Bk-0), $A_1$ and $A_4$ each independently represent an optionally substituted phenyl group or an optionally substituted naphthyl group, and $A_2$ and $A_3$ each independently represent an optionally substituted naphthyl group. Each of $A_1$, $A_2$, $A_3$ and $A_4$ contains at least one sulfo group. One of X and Y represents a hydroxyl group, and the other represents an amino group. M represents a hydrogen atom, an alkali metal, a cation of an organic amine or an ammonium ion.

Examples of the dyes used in the yellow, magenta and cyan dye inks include, without limitation: yellow dyes such as C.I. Direct Yellows 12, 24, 26, 27, 28, 33, 39, 58, 86, 98, 100, 132, 142 and 169, C.I. Acid Yellows 3, 11, 17, 19, 23, 25, 29, 38, 42, 49, 59, 61, 71 and 72, C.I. Basic Yellow 40, and C.I. Reactive Yellow 2; magenta dyes such as dyes represented by the general formulas (M-0) and (M-00) below, C.I. Direct Reds 4, 17, 28, 37, 63, 75, 79, 80, 81, 83 and 254, C.I. Acid Reds 1, 6, 8, 18, 32, 35, 37, 42, 52, 85, 88, 115, 133, 134, 154, 186, 249, 289 and 407, C.I. Basic Reds 9, 12 and 13, and C.I. Reactive Reds 4, 23, 24, 31 and 56; cyan dyes such as C.I. Direct Blues 1, 6, 8, 15, 22, 25, 71, 76, 80, 86, 87, 90, 106, 108, 123, 163, 165, 199 and 226, C.I. Acid Blues 9, 22, 29, 40, 59, 62, 93, 102, 104, 112, 113, 117, 120, 167, 175, 183, 229 and 234, C.I. Basic Blues 1, 3, 5, 7, 9, 24, 25, 26, 28 and 29, C.I. Reactive Blues 7, 13 and 49; and the like.

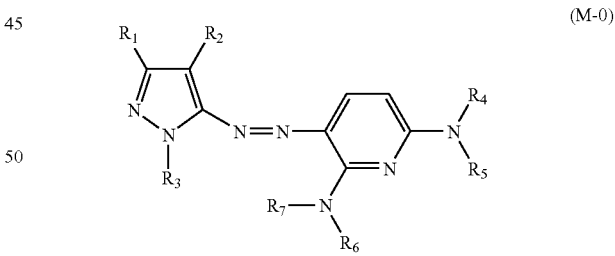

(M-0)

In the general formula (M-0), $R_1$ represents a hydrogen atom, an optionally substituted alkyl group or an optionally substituted aryl group. $R_2$ represents a hydrogen atom, a halogen atom or a cyano group. $R_3$ represents a hydrogen atom, an optionally substituted alkyl group, an optionally substituted aryl group or an optionally substituted heterocyclic group. $R_4$, $R_5$, $R_6$ and $R_7$ each independently represent a hydrogen atom, an optionally substituted alkyl group, an optionally substituted aryl group, an optionally substituted heterocyclic group, an optionally substituted sulfonyl group or an optionally substituted acyl group. Note that $R_4$ and $R_5$ are not simultaneously hydrogen atoms, and $R_6$ and $R_7$ are not simultaneously hydrogen atoms. $A_1$ and $A_2$ are both optionally substituted carbon atoms, or one of $A_1$ and $A_2$ is an optionally substituted carbon atom and the other is a nitrogen atom.

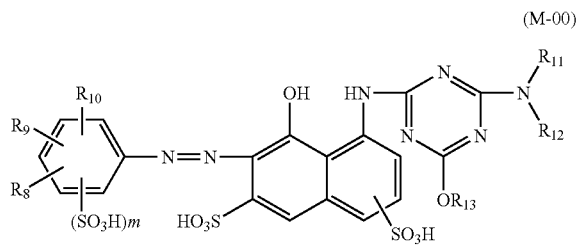

(M-00)

In the general formula (M-00), $R_8$, $R_9$ and $R_{10}$ each independently represent an optionally substituted alkyl group, an optionally substituted alkoxy group, a halogen atom, a hydrogen atom, a hydroxyl group, an optionally substituted carbamoyl group, an optionally substituted sulfamoyl group, an optionally substituted amino group, a nitro group, a sulfonate ester group, an optionally substituted alkylsulfonyl group, an optionally substituted arylsulfonyl group, a carboxyl group or a carboxylate group. m represents a number of 0, 1 or 2, and $R_{11}$, $R_{12}$ and $R_{13}$ each independently represent a hydrogen atom, an optionally substituted alkyl group, an optionally substituted alkenyl group, an optionally substituted aryl group, an optionally substituted aralkyl group, an optionally substituted alicyclic group or an optionally substituted heterocyclic group.

Deionized water is used as water used in each of the inks constituting the ink set for ink-jet recording of the present invention.

The water soluble organic solvent used in each of the inks constituting the ink set for ink-jet recording of the present invention contains a humectant having the primary effect of preventing drying of the ink in the end portion of an ink-jet head and a penetrant for controlling drying speed on paper.

Examples of the humectant include, without limitation, lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and keto-alcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol and hexylene glycol; glycerin; 2-pyrrolidone; N-methyl-2-pyrrolidone; 1,3-dimethyl-2-imidazolidinone; and the like.

The amount of the humectant with respect to the total amount of each of the inks constituting the ink set for ink-jet recording is in the range of from about 0 wt. % to about 95 wt. %, in the range of from about 5 wt. % to about 80 wt. %, and in the range of from about 5 wt. % to about 50 wt. %.

Examples of the penetrant include, without limitation, glycol-based ethers such as ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, tripropylene glycol propyl ether, and tripropylene glycol butyl ether, and the like.

When the amount of the penetrant is too large, the penetrability of the ink to paper may become excessively high, and this may cause blurring. Therefore, the amount of the penetrant with respect to the total amount of each of the inks constituting the ink set for ink-jet recording is in the range of from about 0 wt. % to about 20 wt. %, in the range of from about 0.1 wt. % to about 15 wt. %, and in the range of from about 1 wt. % to about 10 wt. %.

If necessary, each of the inks constituting the ink set for ink-jet recording of the present invention may further contain other conventionally known additives such as: viscosity modifiers such as polyvinyl alcohol, polyvinylpyrrolidone and water soluble resins; surface tension modifiers; mildew proofing agents; pH modifiers; and the like.

Each of the inks constituting the ink set for ink-jet recording of the present invention may be prepared by uniformly mixing the dye, water, the water soluble organic solvent and other additives, and removing non-dissolved materials through a filter.

Each of the inks constituting the ink set for ink-jet recording of the present invention may be filled into a known ink cartridge for an ink-jet printer, and used for ink-jet recording.

EXAMPLES

Hereinbelow, the present invention is specifically described by way of Examples.

Examples 1 to 4 and Comparative Examples 1 to 3

(1) Preparation of Inks

The components summarized in Table 1 were mixed uniformly, whereby black dye inks (Bk-1, Bk-2, Bk-3 and Bk-4), yellow dye inks (Y-1 and Y-2), magenta dye inks (M-1, M-2 and M-3) and cyan dye inks (C-1, C-2 and C-3) were prepared.

TABLE 1

| | | (unit: wt%) | | | | | | | | | | | |
|---|---|---|---|---|---|---|---|---|---|---|---|---|---|
| | | Bk-1 | Bk-2 | Bk-3 | Bk-4 | Y-1 | Y-2 | M-1 | M-2 | M-3 | C-1 | C-2 | C-3 |
| Coloring agent | C.I. Direct Black 19 | 3.0 | — | — | — | — | — | — | — | — | — | — | — |
| | C.I. Food Black 2 | — | 3.0 | — | 2.0 | — | — | — | — | — | — | — | — |
| | C.I. Direct Black 32 | — | — | 3.0 | — | — | — | — | — | — | — | — | — |
| | C.I. Acid Yellow 23 | — | — | — | 0.5 | 3.0 | — | — | — | — | — | — | — |
| | C.I. Direct Yellow 132 | — | — | — | — | — | 3.0 | — | — | — | — | — | — |
| | C.I. Acid Red 289 | — | — | — | — | — | — | 3.0 | — | — | — | — | — |

TABLE 1-continued (unit: wt%)

| | Bk-1 | Bk-2 | Bk-3 | Bk-4 | Y-1 | Y-2 | M-1 | M-2 | M-3 | C-1 | C-2 | C-3 |
|---|---|---|---|---|---|---|---|---|---|---|---|---|
| C.I. Direct Red 80 | — | — | — | — | — | — | — | 3.0 | — | — | — | — |
| Magenta dye (*1) | — | — | — | 0.5 | — | — | — | — | 3.0 | — | — | — |
| Cyan dye (*2) | — | — | — | — | — | — | — | — | — | 3.0 | — | — |
| C.I. Direct Blue 199 | — | — | — | — | — | — | — | — | — | — | 3.0 | — |
| Cyan dye (*3) | — | — | — | — | — | — | — | — | — | — | — | 3.0 |
| Glycerin | 35.0 | 35.0 | 35.0 | 35.0 | 35.0 | 35.0 | 35.0 | 35.0 | 35.0 | 35.0 | 35.0 | 35.0 |
| Triethylene glycol-n-butyl ether | 4.0 | 4.0 | 4.0 | 4.0 | 4.0 | 4.0 | 4.0 | 4.0 | 4.0 | 4.0 | 4.0 | 4.0 |
| Surfactant (*4) | 0.2 | 0.2 | 0.2 | 0.2 | 0.2 | 0.2 | 0.2 | 0.2 | 0.2 | 0.2 | 0.2 | 0.2 |
| Pure water | | | | | | Balance | | | | | | |

Note:
(*1)

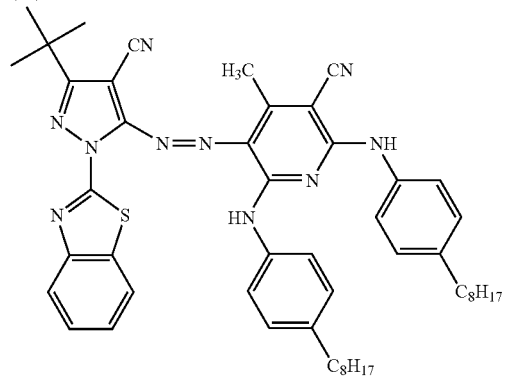

(*2)

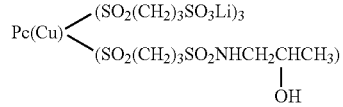

"Pc(Cu)" is a copper phthalocyanine skeltone group.
(*3)

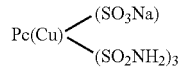

"Pc(Cu)" is a copper phthalocyanine skeltone group.
(*4) Polyoxy lauryl (12, 13) ether sodium sulfate (3E. O)

(2) Production of Patches for Evaluation

Each of the inks summarized in Table 1 was filled into a predetermined ink cartridge, and the cartridge was attached to a digital multifunction device equipped with an ink-jet printer (DCP-115C, product of Brother Industries, Ltd.). Then, the driver was set to the "fine print mode," and gradation samples of each ink were printed on photo glossy paper BP61GLA (product of Brother Industries, Ltd.). A patch having an OD value of about 1.0 was used as a patch for evaluation.

In addition, black gradation samples were printed with the black dye ink in combination with the yellow, magenta and cyan dye inks (hereinbelow referred to as color inks). In this case, the volume ratio of each color ink to the black ink was 0.4 to 0.6:0.4 to 0.6. A patch having an OD value of about 1.0 was used as a patch for evaluating a tetra-composite black.

(3) Ozone Resistance Evaluation (3-1) Ozone Resistance Test

Each of the patches for evaluation produced in (2) was subjected to an ozone resistance test as follows.

The ozone resistance test was performed by allowing the patch to stand under the conditions of an ozone concentration of 1 ppm, a chamber temperature of 24° C. a chamber relative humidity of 60% for 40 hours (this corresponds to an exposure for about one year in an actual environment) by use of an Ozone Weather Meter OMS-H (product of Suga Test Instruments Co., Ltd.).

(3-2) OD Value Reduction Ratio

The OD value of each patch was measured before and after the ozone resistance test by means of Spectrolino (product of Gretag Macbeth) (light source: $D_{65}$; viewing angle: 2°; Status A).

The OD value reduction ratio was determined from the obtained OD values by using the following equation:

$$OD \text{ value reduction ratio}(\%) = \frac{OD \text{ value before test} - OD \text{ value after test}}{OD \text{ value before test}} \times 100$$

When the OD value reduction ratios of the yellow, magenta and cyan components in the black dye ink patch are abbreviated to "By", "Bm" and "Bc", respectively, and the OD value reduction ratio of the yellow component of the yellow dye ink patch is abbreviated to "Cy", the OD value reduction ratio of the magenta component of the magenta dye ink patch is abbreviated to "Cm", and the OD value reduction ratio of the cyan component of the cyan dye ink patch is abbreviated to "Cc", (By+Cy)/2, (Bm+Cm)/2 and (Bc+Cc)/2 were computed, and the difference among the maximum value and minimum value thereof were determined.

(3-3) Color Balance Evaluation

Each of the patches for evaluating the tetra-composite black was visually observed before and after the ozone resistance test. When the black color was not noticeably tinted after the ozone resistance test because the yellow, magenta and cyan colors faded in a well balanced manner, the patch was evaluated as "G (Good)." When the patch was found to be unnaturally tinted because the color balance was lost, the patch was evaluated as "NG (No Good)."

The above results are summarized in Table 2.

As can be seen from Table 2, in Examples 1 to 4, the order of the OD value reduction ratios of the yellow, magenta and cyan components in the black ink patch was the reverse of the order of the OD value reduction ratios of the yellow component of the yellow dye ink patch, the magenta component of the magenta dye ink patch and the cyan component of the cyan dye ink patch. Accordingly, the color balance was good even after the ozone resistance test.

In Comparative Example 1, the order of the OD value reduction ratios of the yellow, magenta and cyan components in the black dye ink patch was below.

the yellow component<the magenta component<the cyan component

However, the order of the OD value reduction ratios of the yellow component of the yellow dye ink patch, the magenta component of the magenta dye ink patch and the cyan component of the cyan dye ink patch was below.

the yellow component<the magenta component<the cyan component

Therefore, the order was not reversed, so that the color balance after the ozone resistance test was poor.

In Comparative Example 2, the order of the OD value reduction ratios of the yellow, magenta and cyan components in the black dye ink patch was below.

the yellow component<the magenta component<the cyan component

However, the order of the OD value reduction ratios of the yellow component of the yellow dye ink patch, the magenta component of the magenta dye ink patch and the cyan component of the cyan dye ink patch was below.

the magenta component<the cyan component<the yellow component

Therefore, the order was not reversed, so that the color balance after the ozone resistance test was poor.

In Comparative Example 3, the order of the OD value reduction ratios of the yellow, magenta and cyan components in the black dye ink patch was below.

the magenta component<the yellow component<the cyan component

However, the order of the OD value reduction ratios of the yellow component of the yellow dye ink patch, the magenta component of the magenta dye ink patch and the cyan component of the cyan dye ink patch was below.

the magenta component<the cyan component<the yellow component

Therefore, the order was not reversed, so that the color balance after the ozone resistance test was poor.

The present invention is not limited to the embodiments described in the Examples, which are provided for illustrative purposes only. The material substances, their amounts used, and the conditions of producing them may be varied and modified without departing from the spirit and the scope of the invention as described herein.

TABLE 2

| | | Example 1 | Example 2 | Example 3 | Example 4 | Comparative Example 1 | Comparative Example 2 | Comparative Example 3 |
|---|---|---|---|---|---|---|---|---|
| Evaluation of black dye ink patch | Black dye ink | Bk-1 | Bk-2 | Bk-3 | Bk-4 | Bk-1 | Bk-2 | Bk-4 |
| | Order of OD value reduction ratios | Y < M < C | Y < M < C | Y < M < C | M < Y < C | Y < M < C | Y < M < C | M < Y < C |
| | OD value reduction ratio of yellow component (Y) = By | 19% | 20% | 18% | 24% | 19% | 20% | 24% |
| | OD value reduction ratio of magenta component (M) = Bm | 25% | 28% | 29% | 22% | 25% | 28% | 22% |
| | OD value reduction ratio of cyan component (C) = Bc | 29% | 42% | 44% | 44% | 29% | 42% | 44% |
| Evaluation of yellow dye ink patch, magenta dye ink patch and cyan dye ink patch | Yellow dye ink | Y-1 | Y-1 | Y-1 | Y-2 | Y-2 | Y-1 | Y-1 |
| | OD value reduction ratio of yellow component (Y) = Cy | 29% | 29% | 29% | 10% | 10% | 29% | 29% |
| | Magenta dye ink | M-1 | M-1 | M-2 | M-2 | M-2 | M-3 | M-3 |
| | OD value reduction ratio of magenta component (M) = Cm | 10% | 10% | 18% | 18% | 18% | 6% | 6% |
| | Cyan dye ink | C-1 | C-1 | C-1 | C-1 | C-2 | C-3 | C-3 |
| | OD value reduction ratio of cyan component (C) = Cc | 6% | 6% | 6% | 6% | 35% | 19% | 19% |
| | Order of OD value reduction ratios | C < M < Y | C < M < Y | C < M < Y | C < Y < M | Y < M < C | M < C < Y | M < C < Y |
| Black dye ink patch + composite black patch | (By + Cy)/2 | 24.0% | 24.5% | 23.5% | 17.0% | 14.5% | 24.5% | 26.5% |
| | (Bm + Cm)/2 | 17.5% | 19.0% | 23.5% | 20.0% | 21.5% | 17.0% | 14.0% |
| | (Bc + Cc)/2 | 17.5% | 24.0% | 25.0% | 25.0% | 32.0% | 30.5% | 31.5% |
| | Difference among maximum value and minimum value | 6.5% | 5.5% | 1.5% | 8.0% | 17.5% | 13.5% | 17.5% |
| | Color balance evaluation | G | G | G | G | NG | NG | NG |

What is claimed is:

1. An ink set for ink-jet recording, comprising:
 a yellow dye ink;
 a magenta dye ink;
 a cyan dye ink; and
 a black dye ink,
 wherein, when a patch of each of the inks is formed and is subjected to a predetermined ozone resistance test, optical density value reduction ratios of the patches upon the ozone resistance test are such that an order of optical density value reduction ratios of yellow, magenta and cyan components in the black dye ink patch is the reverse of an order of optical density value reduction ratios of a yellow component of the yellow dye ink patch, a magenta component of the magenta dye ink patch and a cyan component of the cyan dye ink patch.

2. The ink set for ink-jet recording according to claim 1, wherein a difference between a maximum value and a minimum value among $(By+Cy)/2$, $(Bm+Cm)/2$ and $(Bc+Cc)/2$ is about 10% or less,
 where $By$ is the optical density value reduction ratio (%) of the yellow component in the black dye ink patch, $Bm$ is the optical density value reduction ratio (%) of the magenta component in the black dye ink patch, $Bc$ is the optical density value reduction ratio (%) of the cyan component in the black dye ink patch, $Cy$ is the optical density value reduction ratio (%) of the yellow component of the yellow dye ink patch, $Cm$ is the optical density value reduction ratio (%) of the magenta component of the magenta dye ink patch, and $Cc$ is the optical density value reduction ratio (%) of the cyan component of the cyan dye ink patch.

3. The ink set for ink-jet recording according to claim 1, wherein the yellow ink is an ink that alone produces the yellow color having a lightness ($L^*$) in the range of about 70 or more and about 100 or less, a chroma ($C^*$) in the range of about 55 or more and 90 or less and a hue angle (h) in the range of about 70 degrees or more and about 140 degrees or less; the magenta ink is an ink that alone produces the magenta color having a lightness ($L^*$) in the range of about 40 or more and about 70 or less, a chroma ($C^*$) in the range of about 60 or more and about 100 or less and a hue angle (h) in the range of about 320 degrees or more and about 360 degrees or less or of about 0 degrees or more and about 10 degrees or less; the cyan ink is an ink that alone produces the cyan color having a lightness ($L^*$) in the range of about 50 or more and about 85 or less, a chroma ($C^*$) in the range of about 40 or more and about 80 or less and a hue angle (h) in the range of about 215 degrees or more and about 255 degrees or less; and the black ink is an ink that alone produces the black color in an achromatic range with a chroma ($C^*$) of about 15 or less.

* * * * *